United States Patent
Elzur

(12) United States Patent (10) Patent No.: US 9,935,841 B2
Elzur (45) Date of Patent: Apr. 3, 2018

(54) TRAFFIC FORWARDING FOR PROCESSING IN NETWORK ENVIRONMENT

(71) Applicant: Intel Corporation, Santa Clara, CA (US)

(72) Inventor: Uri Elzur, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 13/751,932

(22) Filed: Jan. 28, 2013

(65) Prior Publication Data

US 2014/0215036 A1 Jul. 31, 2014

(51) Int. Cl.
G06F 15/173 (2006.01)
H04L 12/24 (2006.01)
H04L 12/931 (2013.01)

(52) U.S. Cl.
CPC .......... *H04L 41/0893* (2013.01); *H04L 49/50* (2013.01)

(58) Field of Classification Search
CPC ............................ H04L 41/0893; H04L 49/50
USPC ........................................................ 709/223
See application file for complete search history.

(56) References Cited

U.S. PATENT DOCUMENTS

| | | | |
|---|---|---|---|
| 5,692,193 A | 11/1997 | Jagannathan et al. | |
| 6,243,667 B1 * | 6/2001 | Kerr et al. | 703/27 |
| 7,043,659 B1 | 5/2006 | Klein et al. | |
| 7,607,007 B2 * | 10/2009 | Stanford-Clark | H04L 63/0428 709/238 |
| 7,796,593 B1 * | 9/2010 | Ghosh | H04L 12/4633 370/389 |
| 7,826,482 B1 * | 11/2010 | Minei | H04L 45/24 370/395.5 |
| 8,797,867 B1 * | 8/2014 | Chen et al. | 370/232 |
| 8,856,926 B2 * | 10/2014 | Narayanaswamy | H04L 63/1425 713/164 |
| 8,875,223 B1 | 10/2014 | Chen | |
| 2008/0027947 A1 | 1/2008 | Pritchett | |
| 2008/0282253 A1 | 11/2008 | Huizenga | |
| 2009/0328225 A1 | 12/2009 | Chambers | |
| 2010/0118868 A1 | 5/2010 | Dabagh | |
| 2010/0211946 A1 | 8/2010 | Elzur | |
| 2010/0223397 A1 | 9/2010 | Elzur | |
| 2010/0287262 A1 | 11/2010 | Elzur | |
| 2010/0318652 A1 | 12/2010 | Samba | |
| 2011/0010581 A1 | 1/2011 | Tanttu | |
| 2011/0032944 A1 | 2/2011 | Elzur et al. | |

(Continued)

FOREIGN PATENT DOCUMENTS

EP 2698952 2/2014
EP 2698952 A1 2/2014

(Continued)

OTHER PUBLICATIONS

VMware Information Guide, "VMware Virtual Networking Concepts", Revision: 20070718 Item: IN-018-INF-01-01, 2007, 12 pages.

(Continued)

*Primary Examiner* — Sm Rahman
(74) *Attorney, Agent, or Firm* — Christopher K. Gagne

(57) ABSTRACT

An embodiment may include forwarding, at least in part, received traffic, based at least in part upon programming provided, at least in part, by at least one controller. The programming may be based at least in part upon at least one policy. The forwarding may be in accordance with various parameters, criteria, usage models, processing considerations, etc. Many modifications are possible.

29 Claims, 3 Drawing Sheets

(56) References Cited

U.S. PATENT DOCUMENTS

| | | |
|---|---|---|
| 2011/0035498 A1 | 2/2011 | Shah et al. |
| 2011/0078679 A1 | 3/2011 | Bozek |
| 2011/0185076 A1 | 7/2011 | Elzur et al. |
| 2011/0219118 A1 | 9/2011 | Cowan et al. |
| 2011/0239010 A1 | 9/2011 | Jain et al. |
| 2011/0243553 A1 | 10/2011 | Russell |
| 2011/0270968 A1 | 11/2011 | Salsburg et al. |
| 2011/0292792 A1 | 12/2011 | Zuo |
| 2011/0320606 A1 | 12/2011 | Madduri et al. |
| 2012/0016970 A1 | 1/2012 | Shah et al. |
| 2012/0163180 A1* | 6/2012 | Goel ............................. 370/238 |
| 2012/0179824 A1 | 7/2012 | Jackson |
| 2012/0185913 A1 | 7/2012 | Martinez |
| 2012/0239739 A1 | 9/2012 | Manglik et al. |
| 2013/0007734 A1 | 1/2013 | McCloy |
| 2013/0034015 A1 | 2/2013 | Jaiswal et al. |
| 2013/0086235 A1 | 4/2013 | Ferris |
| 2013/0103834 A1* | 4/2013 | Dzerve et al. ............... 709/225 |
| 2013/0124702 A1 | 5/2013 | Shah et al. |
| 2013/0174157 A1 | 7/2013 | Elzur |
| 2013/0268646 A1* | 10/2013 | Doron et al. ................ 709/223 |
| 2014/0033275 A1* | 1/2014 | Kawamoto ...................... 726/3 |
| 2014/0119239 A1* | 5/2014 | Hu et al. ...................... 370/256 |
| 2014/0136706 A1 | 5/2014 | Elzur |
| 2014/0137182 A1 | 5/2014 | Elzur |
| 2014/0189074 A1* | 7/2014 | Parker .......................... 709/220 |
| 2014/0215036 A1 | 7/2014 | Elzur |
| 2014/0215465 A1 | 7/2014 | Elzur |

FOREIGN PATENT DOCUMENTS

| | | |
|---|---|---|
| KR | 101672661 | 11/2016 |
| WO | 2012135442 A1 | 10/2012 |
| WO | 2012141086 A1 | 10/2012 |
| WO | 20120135442 | 10/2012 |
| WO | 20120141086 | 10/2012 |
| WO | 2014/077904 A1 | 5/2014 |
| WO | 2014/117081 A2 | 7/2014 |

OTHER PUBLICATIONS

Apostol et al., "Policy Based Resource Allocation in Cloud Systems", 2011 International Conference on P2P, Parallel, Grid, Cloud and Internet Computing, IEEE, 2011 pp. 285-288.

International Search Report and Written Opinion received for PCT Patent Application No. PCT/US2013/046123, dated Oct. 31, 2013, 9 pages.

International Search Report and Written Opinion received for PCT Patent Application No. PCT/US2014/013184, dated Aug. 30, 2014, 9 pages.

Office Action dated Sep. 23, 2015 in U.S. Appl. No. 14/134,982, 36 pages.

Notice of Allowance received for U.S. Appl. No. 13/675,324, dated Nov. 10, 2014, 15 pages.

Written Opinion of the International Searching Authority dated Aug. 30, 2014 for PCT Application No. PCT/US2014/013184 (4 pages).

International Preliminary Report on Patentability dated Jul. 28, 2015 for PCT Application No. PCT/US2014/013184 (5 pages).

International Search Report dated Aug. 30, 2014 for PCT Application No. PCT/US2014/013184 (3 pages).

Notice of Allowance dated Feb. 3, 2016 (and related attachments) in U.S. Appl. No. 14/134,982, 18 pages.

Notice of Allowance dated Sep. 22, 2016 in Korean Patent Application No. 10-2015-7014167 (2 pages).

Communication pursuant to Rule 164(1) EPC dated Oct. 31, 2016 in European Patent Application No. 14743627.3-1954 (9 pages).

Office Action in Chinese Patent Application No. 201480003740.9, dated Mar. 2, 2017 (and related search report).

Office Action dated Mar. 10, 2016 in Korean Patent Application No. 10-2015-7014167 (7 pages with 5 pages summarized English translation).

Extended European Search Report in European Patent Application No. 14743627.3, dated Mar. 28, 2017 (and related search report).

Communication pursuant to Rules 70(2) and 70a(2) EPC in in European Patent Application No. 14743627.3, dated Apr. 18, 2017.

Official Communication in German Patent Application No. DE 102014116932.8, dated Jan. 9, 2017.

Pisa, "Openview and Xen-Based Virtual Network Migration," IFIP Advances in Information and Communication Technology, Jan. 1, 2010.

Lu, "Using CPU as a traffic co-processing unit in commodity switches," Hot Topics in Software Defined Networks, ACM, Aug. 13, 2012.

* cited by examiner

TRAFFIC FORWARDING FOR PROCESSING IN NETWORK ENVIRONMENT

FIELD

This disclosure relates to traffic forwarding in a (e.g., software-defined) network environment.

BACKGROUND

In one conventional arrangement, the resources of a distributed computing system are shared among multiple users. The resources are shared, using virtualization and/or other (e.g., physically-based) techniques, in accordance with usage policies derived from user service agreements. In this conventional arrangement, such usage policies are either set in a centralized fashion by a centralized control mechanism remote from an individual respective computing node in the system, or in a localized fashion by respective localized control mechanisms at each respective computing node, but enforcement may take place at the local computing nodes.

These resources typically include hardware and software resources that provide and/or impart various kinds of processing to packets received by the system, and/or provide other capabilities, such as various services, appliances, and offload processing. Depending upon the configuration of the distributed computing system, the computing nodes to which these resources are assigned, and their respective workloads, configurations, etc., are selected either by the centralized control mechanism or the localized control mechanisms. If a given packet is to undergo multiple kinds of processing by multiple resources, a switch is employed to forward the packet to and among the multiple resources.

Unfortunately, the above conventional arrangement suffers from certain disadvantages and drawbacks. For example, although the processing that is to be imparted to the packets can be individualized on a per-user, per-policy basis, etc., the specific manner in which the policies, processing, and resource configuration/locations are implemented in the system typically is not coordinated in a fashion that meaningfully facilitates or improves system processing efficiency. For example, without such meaningful coordination, resulting traffic and/or processing patterns in the system may result in overuse, underuse, or thrashing of the switch, various resources, and/or certain ports of the switch and/or the various resources. Alternatively or additionally, without such meaningful coordination, traffic may undesirably "bounce" among the switch and/or certain resources, or take an undesirably large number of hops in the network.

The above conventional arrangement suffers from additional disadvantages and/or drawbacks. For example, the above conventional system may not be able to provide real time or near real time fine granularity for quality of service adjustments to be made to, and/or statistically accurate visibility of workloads and/or resource utilizations, as the workloads and/or utilizations change in and/or among the computing nodes. This is especially true in cases where the adjustments to and/or visibility into such workloads and/or utilizations are to be accomplished on a per user/workload basis in adherence to the user service agreements.

A further drawback of this conventional arrangement is that it affords relatively little in the way of processing/policy flexibility and dynamic processing capabilities, for example, depending upon the particular contents of received packets. For example, in at least certain circumstances, it would be useful to be able to modify or adjust the policies, processing, processing order, and/or processing resource configuration/locations that are applicable to and/or to be used in connection with received packets, based upon the particular contents of the received packets. Additional drawbacks of this conventional arrangement include inability to reduce to the extent desirable processing and packet transmission latency and jitter.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
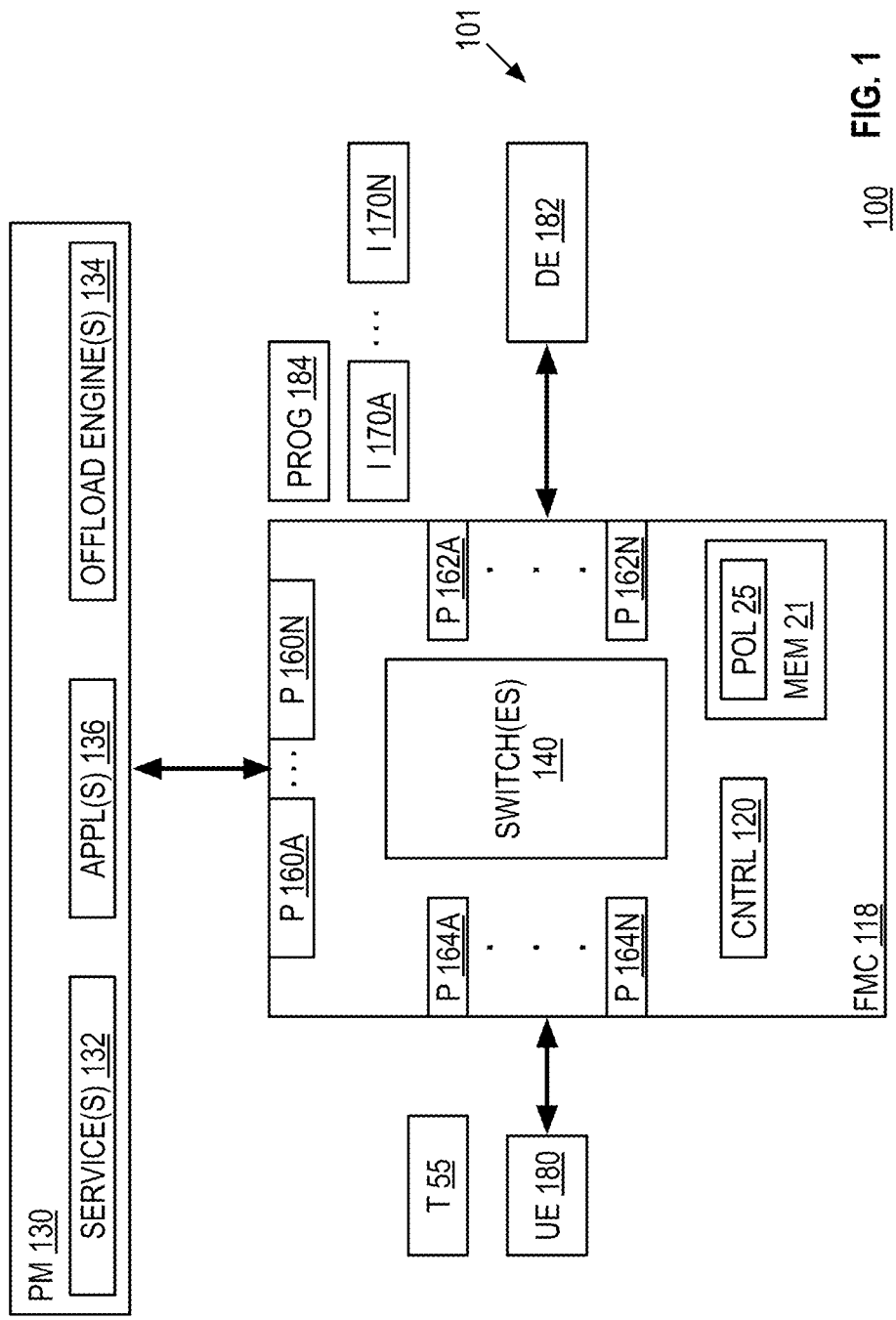
FIG. 1 illustrates an embodiment.

FIG. 1 illustrates a system embodiment 100. System 100 may include one or more software-defined networks (SDN) 101. SDN 101 may be, comprise, be comprised in, and/or be associated with, at least in part, e.g., one or more cloud computing environments (CCE) that may facilitate, at least in part, implementation of one or more (not shown, and in this embodiment, a plurality of) virtual and/or isolated computing environments to be associated with and/or used by, at least in part, one or more (and in this embodiment, a plurality of) users, tenants, etc. in accordance with and/or as per, at least in part, one or more (and in this embodiment, a plurality of) policies 25. These policies 25 may arise out, embody, and/or facilitate implementation of, at least in part, one or more (and in this embodiment a plurality of) service arrangements. Additionally or alternatively, in this embodiment, one or more translation mechanisms may be employed, for example, to facilitate translation, at least in part, between (on the one hand) one or more relatively high level policy-related descriptors and/or definitions related to, for example, one or more service arrangements, service agreements, etc., and (on the other hand) one or more relatively lower level (e.g., infrastructure oriented) policies that may be derived, at least in part, from the one or more service arrangements, service agreements, etc. Additionally or alternatively, without departing from this embodiment, embodiment 100 may comprise, at least in part, one or more other and/or additional types of networks (e.g., other than and/or in addition to SDN 101.

In this embodiment, SDN 101 may comprise, at least in part, forwarding mechanism circuitry (FMC) 118 and/or one or more (and in this embodiment a plurality of) processing mechanisms 130. FMC 118 may comprise ports 164A . . . 164N, 162A . . . 162N, and/or 160A . . . 160N. One or more upstream (e.g., relative to SDN 101, one or more downstream communicating entities 182, and/or FMC 118) communicating entities 180 may be communicatively coupled to FMC 118 via one or more of the ports 164A . . . 164N. Processing mechanisms 130 may be communicatively coupled to FMC 118 via one or more of the ports 160A . . . 160N. One or more downstream (e.g., relative to SDN 101, one or more upstream communicating entities 180, and/or FMC 118) communicating entities 182 may be communicatively coupled to FMC 118 via one or more of the ports 162A . . . 162N.

FMC 118 may comprise, at least in part, one or more virtual and/or physical switches 140, one or more controllers 120, and/or computer-readable memory 21. Memory 21 may comprise, at least in part, policies 25. One or more controllers 120 may be or comprise, for example, one or more SDN (and/or other type of) controllers. Additionally or alternatively, in this embodiment, one or more controllers 120 may be remote, at least in part, to FMC 118, and/or may be communicatively coupled, at least in part, to one or more switches 140 (e.g., in-band and/or out-of-band, at least in part).

Processing mechanisms 130 may comprise, at least in part, one or more SDN (and/or other type of) network services 132, one or more SDN (and/or other type of) applications 136, and/or one or more (e.g., hardware) offload engines 134.

In this embodiment, FMC 118, one or more switches 140 and/or one or more controllers 120 may exhibit (in whole or in part) the features, construction, and/or operations of the policy engine circuitry described in co-pending U.S. patent application Ser. No. 13/675,324, filed Nov. 13, 2012, entitled "Policy Enforcement In Computing Environment." Additionally or alternatively, the policies 25 and/or SDN 101 may exhibit (in whole or in part) the features, construction, and/or operations of the cloud computing environment and/or platform resource management policies, respectively, described in the aforesaid co-pending U.S. patent application. Without departing from this embodiment, although policy enforcement may be carried out, at least in part, by policy engine circuitry, it may additionally or alternatively be assisted and/or augmented by, for example, one or more resources that may be external to one or more end nodes (e.g., in one or more rack servers and/or other components).

In this embodiment, a policy may be and/or comprise, at least in part, (1) one or more rules, instructions, commands, processes, procedures, permissions, and/or interdictions, and/or (2) one or more goals and/or results that may be achieved and/or intended to be achieved as a result, at least in part, of implementing one or more rules, instructions, commands, processes, procedures, permissions, and/or interdictions. Also in this embodiment, enforcement of a policy may comprise, at least in part, implementation and/or execution of (1) one or more rules, instructions, commands, processes, procedures, permissions, and/or interdictions, and/or (2) achievement, at least in part, of one or more goals and/or results.

In this embodiment, a platform may be or comprise one or more physical, logical, and/or virtual computing entities, such as, for example, one or more hosts. Also in this embodiment, the terms host computer, host, platform, server, client, network node, and node may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a network may be or comprise any mechanism, instrumentality, modality, and/or portion thereof that permits, facilitates, and/or allows, at least in part, two or more entities to be communicatively coupled together. In this embodiment, a SDN may be or comprise a network that may have one or more features, configurations, capabilities, and/or operations that may be capable of being defined, established, maintained, and/or modified, at least in part, by, under control of, and/or using, at least in part, programming, and/or one or more (e.g., software) programs, application program interfaces (API), and/or processes.

In this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction and/or programming may include data and/or one or more commands. In this embodiment, a packet and/or frame may be or comprise one or more symbols and/or values. In this embodiment, traffic and/or network traffic may be or comprise one or more packets. In this embodiment, a communication link may be or comprise any mechanism that is capable of and/or permits, at least in part, at least two entities to be or to become communicatively coupled.

In this embodiment, "circuitry" may comprise, for example, singly or in any combination, analog circuitry, digital circuitry, hardwired circuitry, programmable circuitry, co-processor circuitry, and/or state machine circuitry. Also in this embodiment, forwarding mechanism circuitry may be and/or comprise, at least in part, circuitry that is capable, at least in part, of issuing, at least in part, one or more packets that have been received, at least in part, by the circuitry toward one or more (intermediate and/or ultimate) destinations (e.g., via and/or using one or more hops). In this embodiment, a forwarding operation and/or forwarding may be or comprising, at least in part, issuing, at least in part, one or more packets toward one or more (intermediate and/or ultimate) destinations (e.g., via and/or using one or more hops).

In this embodiment, a processor, host processor, central processing unit (CPU), processor core, core, and/or controller each may comprise respective circuitry capable of performing, at least in part, one or more arithmetic and/or logical operations, and/or of executing, at least in part, one or more instructions. In this embodiment, memory, cache, and cache memory each may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. In this embodiment, memory 21 may comprise one or more instructions that when executed by, for example, circuitry 118 (and/or one or more components thereof) and/or one or more other components of network 101 may result, at least in part, in circuitry 118 (and/or one or more components thereof) and/or one or more other components of network 101, performing, at least in part, the operations that are described herein as being performed, by circuitry 118 (one or more components thereof) and/or one or more other components of network 101. Of course, nothing herein should be viewed as limiting the scope of this embodiment. For example, without departing from this embodiment, these one or more instructions may be run in one or more processes/programs (not shown) that may reside, at least in part, in one or more user spaces/nodes (not shown).

In this embodiment, an offload engine may be or comprise circuitry to perform (e.g., in hardware) processing operations in lieu of those processing operations being performed, at least in part, by a CPU and/or software. For example, without limitation, a hardware offload engine may be or comprise circuitry that may be capable, at least in part, of performing, at least in part, in hardware, compression, decompression, security (e.g., secure socket layer, secure protocol, encryption, decryption, etc.), search and/or comparison (e.g., regular expression, etc.), and/or other operations. Although not shown in the Figures, one or more of the offload engines 134 may be comprised, at least in part, in the forwarding mechanism circuitry 118. Additionally or alternatively, one or more offload engines 134 may be communicatively coupled, at least in part, to one or more switches 140 via one or more of the ports 164A . . . 164N.

In this embodiment, a portion or subset of an entity may comprise all or less than all of the entity. In this embodiment, a set may comprise one or more elements. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions. In this embodiment, an API may be or comprise one or more physical, logical, and/or virtual interfaces via which (1) a first entity provide data and/or one or more signals, commands, instructions to a second entity that may permit and/or facilitate, at least in part, control, monitoring, and/or interaction, at least in part, with the second entity, and/or (2) the second entity may provide other data and/or one or more other signals that may permit and/or facilitate, at least in part, such control, monitoring, and/or interaction, at least in part.

In this embodiment, a computing environment may be or comprise circuitry capable, at least in part, of being used, alone and/or in combination with one or more other computing environments and/or entities, to perform, at least in part, one or more operations involved in, facilitating, implementing, related to, and/or comprised in one or more arithmetic, Boolean, logical, storage, networking, input/output (I/O), power management, energy management, and/or other computer-related operations. In this embodiment, a CCE may be or comprise a computing environment that is capable of providing one or more computer-related services in accordance with one or more service arrangements. In this embodiment, a service arrangement may be or comprise an agreement and/or contract between at least one entity that is to receive at least one service and at least one other entity that is to provide or to facilitate provision of the at least one service. In this embodiment, a service may comprise one or more functions, operations, instrumentalities, parameters, permissions, guarantees, interdictions, restrictions, limitations, and/or features involving, using, facilitated by, and/or implemented by, at least in part, one or more computing environments. Examples of such services may comprise, without limitations, computational, network, storage, I/O, webhosting, multimedia, video, audio, quality of service, security, power usage, network communication path selection, network congestion avoidance, and/or other services. In this embodiment, a user may be, comprise, and/or involve, at least in part, one or more human operators, one or more groups and/or associations of human operators, and/or one or more processes (e.g., application processes) associated with and/or that may be capable of being used directly or indirectly by one or more human operators, one or more groups and/or associations of human operators.

In this embodiment, interaction of a first entity with a second entity may be used interchangeably with interaction between the first and second entities. Also in this embodiment, such interaction may be, comprise, facilitate, and/or involve, at least in part, (1) provision, initiation of provision, and/or request for provision of one or more signals, commands, and/or data to the second entity by the first entity, and/or (2) one or more actions and/or changes in state of the second entity in response, at least in part, thereto.

For example, in this embodiment, service arrangements may be established that may be or comprise respective contracts between respective users (on the one side) and one or more entities (on the other side) that may maintain, operate, and/or own, at least in part, the SDN 101. These contracts may specify the respective sets of services and/or parameters of the respective sets of services that are to be provided to the users in and/or by the SDN 101. Policies 25 may be based, at least in part, upon these service arrangements such that, the enforcement, at least in part, of these policies 25 may result, at least in part, in the provision of these respective services to the users in accordance with the users' respective service arrangements and/or the parameters thereof.

Although not shown in the Figures, the individual processing mechanisms, services 132, applications 136, and/or offload engines 134 comprised in processing mechanisms 130 may be communicatively coupled to and/or among each other. Such communicative coupling may permit and/or facilitate, at least in part, transmission, reception, and/or transferal, at least in part, of one or more packets (e.g., received traffic 55) to, between, and/or among the processing mechanisms, 130 services 132, applications 136, virtual machines, and/or offload engines 134.

For example, in this embodiment, one or more controllers 120 may provide and/or issue programming 184 to one or more switches 140 and/or forwarding mechanism circuitry 118 that may result, at least in part, in one or more switches 140 and/or forwarding mechanism circuitry 118 performing one or more forwarding operations involving, at least in part, traffic 55 received, at least in part, by one or more switches 140 and/or forwarding mechanism circuitry 118. The one or more forwarding operations may be determined (e.g., by one or more switches 140 and/or circuitry 118) based at least in part upon the programming 184 provided, at least in part, by one or more controllers 120. Programming 184 may be based at least in part upon one or more policies 25. In this embodiment, such programming 184 may comprise multiple commands/instructions (and/or multiple sets of commands/instructions) separated, at least in part, in time, and/or a single respective set of commands/instructions at a single respective time, for respective received traffic.

In this embodiment, these one or more forwarding operations may be in accordance with one or more of at least the following four cases (a), (b), (c), and/or (d). Each of these cases (a) to (d) will now be briefly summarized, and thereafter, will be described in greater detail.

In case (a), after circuitry 118 and/or one or more switches 140 have previously forwarded, at least in part, at one or more previous times, the received traffic 55, the one or more forwarding operations may comprise again (e.g., subsequently) forwarding, at least in part, the received traffic 55 (e.g., by one or more switches 140 and/or forwarding mechanism circuitry 118) to one or more of the processing mechanisms 130 to permit these one or more of the processing mechanisms 130 to process, at least in part, the received traffic 55. This subsequent forwarding, at least in part, of the received traffic 55 may be based, at least in part, upon (1) which of one or more of the ports 164A . . . 164N the received traffic 55 was previously (at least partially) received, (2) at least one portion (e.g., 232 in FIG. 2) of the contents (e.g., 230 in FIG. 2) of the received traffic 55, and/or (3) the programming 184.

In case (b), after repeatedly receiving, at least in part, at respective times, the received traffic via at least one given port (e.g., comprised in the ports 164A . . . 164N), the one or more forwarding operations may comprise respectively forwarding, at least in part, the received traffic 55 to different ones of the processing mechanisms 130. In case (c), the one or more forwarding operations may comprise multiple forwarding operations to forward, at least in part, the received traffic to multiple of the processing mechanisms 130 in a sequence order that may permit a combined processing to be carried out that satisfies one or more of the policies 25.

In case (d), the one or more forwarding operations may comprise providing, at least in part, in association, at least in part, with the received traffic 55, one or more indications 170A . . . 170N of one or more processing operations that may be associated, at least in part, with one or more of the processing mechanisms 130. The one or more indications 170A . . . 170N may be used, at least in part, in a subsequent forwarding operation (e.g., carried out, at least in part, by the one or more switches 140 and/or forwarding mechanism circuitry 118).

Figure 2:
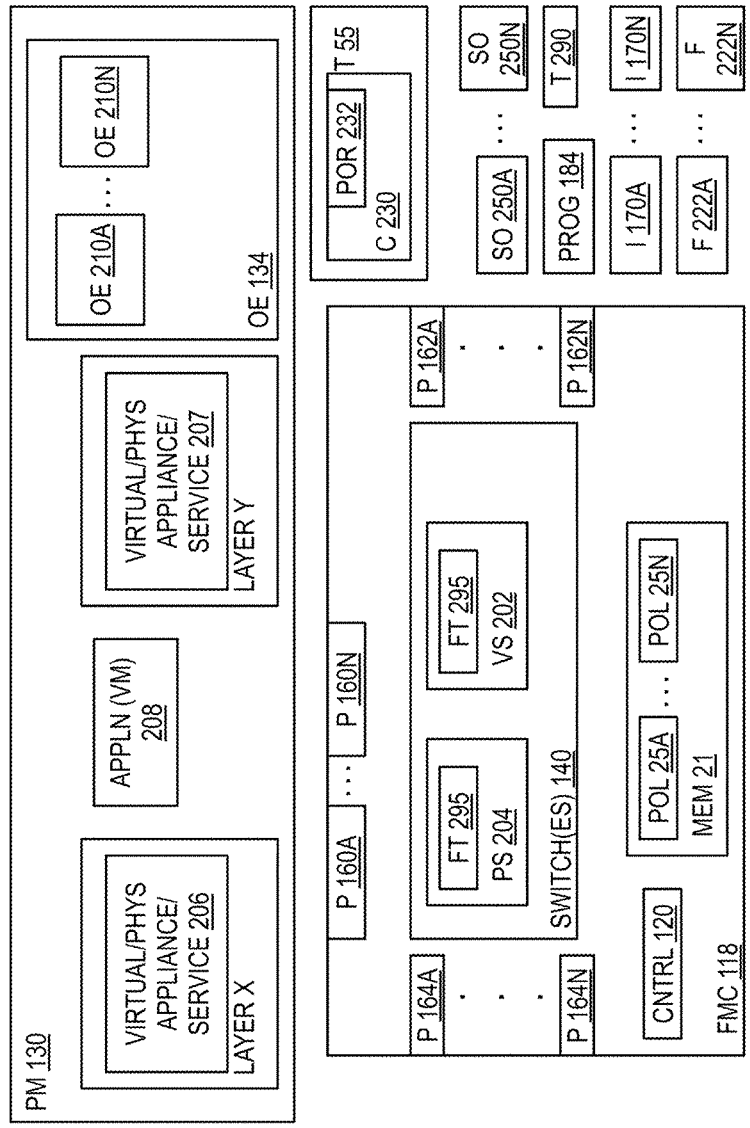
FIG. 2 illustrates features in an embodiment.

For example, in this embodiment, as shown in FIG. 2, processing mechanisms 130 may comprise, at least in part, one or more virtual and/or physical appliances and/or network services 206, one or more applications 208, one or more virtual and/or physical appliances and/or network services 207, and/or one or more offload engines 134. In this embodiment, one or more offload engines 134 may comprise a plurality of offload engines 210A . . . 210N that may implement different (e.g., respective) types of offload operations (e.g., different respective hardware-implemented compression, decompression, security, search and/or comparison, and/or other operations). Policies 25 may comprise a plurality of policies 25A . . . 25N (see FIG. 2). In this embodiment, one or more appliances/services 206 and one or more appliances/services 207 may be, and/or operate in and/or at, different respective processing/protocol layers (e.g., denoted by "X" and "Y" respectively in FIG. 2).

One or more controllers 120 may generate and/or issue, at least in part, programming 184 to one or more switches 140, based at least in part upon and/or in accordance with, at least in part, policies 25A . . . 25N. For example, programming 184 may control, at least in part, operation of one or more virtual switches 202 and/or one or more physical switches 204 so as to result, at least in part, in one or more switches 202 and/or 204 performing the one or more forwarding operations in the manner described herein as being performed by one or more switches 140. Additionally or alternatively, programming 184 may control, at least in part, one or more virtual switches 202 such that one or more switches 202 may control, at least in part, the operation of one or more switches 204 so as to result, at least in part, in one or more switches 204 performing the one or more forwarding operations in the manner described herein as being performed by one or more switches 140.

For example, one or more switches 140 may perform the one or more forwarding operations based at least in part upon and/or in accordance with, at least in part, these policies 25A . . . 25N. In this embodiment, each of the policies 25A . . . 25N may be established based at least in part upon one or more of the following (and/or other parameters/factors): (1) one or more SDN tenants/service arrangements that may be associated, at least in part, with received traffic 55, (2) one or more sources of the received traffic 55 (e.g., one or more upstream entities 180 and/or one or more of the ports 164A . . . 164N via which the received traffic 55 is received by the one or more switches 140), (3) one or more destinations of the received traffic 55 (e.g., one or more downstream entities 182 and/or one or more of the ports 162A . . . 162N via which the received traffic 55 is to be issued from the one or more switches 140), (4) one or more expected uses of and/or to which the received traffic 55 is expected to be put (e.g., after having been processed and/or as a result of processing by one or more of the processing mechanisms 130), (5) one or more flows to which the received traffic 55 belongs, at least in part, (6) one or more interactions involving, at least in part, the received traffic 55 and/or the one or more services 206 and/or 207, and/or one or more of the offload engines 210A . . . 210N (see FIG. 2), and/or (7) one or more portions 232 of the contents 230 of the received traffic 55. This may permit the policies 25A . . . 25N, programming 184, and/or the one or more forwarding operations to be established and/or carried out, at least in part, on per user, expected usage, flow, tenant, source, destination, and/or traffic contents bases, and/or to be based at least in part upon one or more network service/offload engine-received traffic interactions. Advantageously, this may permit and/or facilitate truly individualized and/or particularized treatment and/or processing of the received traffic 55 by the forwarding mechanism circuitry 118 and/or processing mechanisms 130, based upon dynamic and/or static parameters, factors, and/or feedback, in accordance with the policies 25A . . . 25N and/or individual users/tenants service arrangements. This may give rise to, facilitate, and/or result in, at least in part, certain novel, non-obvious, and advantageous usage models.

For example, with particular reference being made to FIG. 2, in one such usage model, the one or more forwarding operations may result, at least in part, in the traffic 55 flowing to, through, and/or being processed, at least in part, by a subset of the processing mechanisms 130. In this usage model, the subset of the processing mechanisms 130 and/or the sequence order of this flow to, through, and/or processing by the subset of the processing mechanisms 130 may be predefined, at least in part, by and/or in accordance with the policies 25A . . . 25N.

For example, one or more switches 140 may initially receive, at least in part, traffic 55 (e.g., via one or more ports 164A), and one or more switches 140 may forward traffic 55, at least in part, to one or more controllers 120 and/or another entity (e.g., one or more applications 208 that may be, be comprised in, and/or may comprise, at least in part, one or more virtual machines). In response, at least in part, one or more controllers 120 and/or one or more applications 208 may determine, at least in part, based at least in part upon the above parameters/factors upon which policies 25A . . . 25N may have been established, which of the policies 25A . . . 25N (e.g., one or more policies 25A) may be applicable to and/or associated with, at least in part, traffic 55. Based upon and/or in accordance with, at least in part, such one or more policies 25A, one or more controllers 120 and/or one or more applications 208 may determine, at least in part, one or more initial processing mechanisms (e.g., one or more appliances/services 206) of the processing mechanisms 130 that is to process (at least initially) the traffic 55 and/or the one or more ports (e.g., one or more ports 160A) via which the traffic 55 is to be forwarded to one or more appliances/services 206. Also, in response at least in part, to receipt of traffic 55, one or more controllers 120 may issue, at least in part, programming 184 that may result, at least in part, in one or more switches 140 performing one or more forwarding operations that may forward, at least in part, the traffic 55 to one or more services 206. Alternatively or additionally, one or more applications 208 may directly forward, at least in part, traffic 55 to one or more appliances/services 206 for processing. Also alternatively or additionally, in response at least in part, to receipt of traffic 55, one or more controllers 120 and/or applications 208 may forward, at least in part, traffic 55 back to one or more switches 140. One or more appliances/services 206 may process, at least in part, the traffic 55. One or more appliances/services 206 then may forward the thus processed traffic 55 to circuitry 118 and/or to one or more applications 208.

One or more controllers 120 and/or one or more applications 208 then may determine, at least in part, based at least in part upon one or more policies 25A, whether additional and/or other processing is to be imparted to traffic 55. If no such additional and/or other processing is to be imparted, one or more controllers 120 and/or applications 208 may provide, at least in part, programming 184 to one or more switches 140 that may result, at least in part, in one or more switches 140 performing one or more forwarding operations that may forward the traffic 55 (e.g., via one or more ports 162A) to one or more destination entities 182.

Conversely, if one or more controllers 120 and/or one or more applications 208 determines, at least in part, that such additionally processing is to be imparted (e.g., by one or more appliances/services 207) to traffic 55, one or more controllers 120 may issue, at least in part, programming 184 to one or more switches 140 that may result, at least in part, in one or more switches 140 performing one or more forwarding operations that may forward, at least in part, the traffic 55 to one or more appliances/services 207. One or more appliances/services 207 may process, at least in part, the traffic 55. One or more appliances/services 207 then may forward the thus processed traffic 55 to circuitry 118 and/or to one or more applications 208. The previously described process involving determination of whether other and/or additional processing is to be imparted, the impartation of such other and/or additional processing, etc. may be repeated, as appropriate, for example, depending upon the particulars of the one or more policies 25A, until all of the processing that is to be imparted in accordance with the one or more policies 25A have been so imparted in a sequence order in accordance with the one or more policies 25A. After all such processing has been so imparted in this sequence order, the combined processing (e.g., that results from the traffic 55 having undergone all of this processing in this sequence order) one or more switches 140 may forward the thus processed traffic 55 to one or more destination entities 182.

Additionally or alternatively, processing may be imparted (e.g., initially and/or subsequently) to traffic 55 by one or more (e.g., one or more engines 210A) of the offload engines 210A ... 210N that may be comprised in offload engines 134, instead of and/or in addition to processing imparted by appliances/services 206, 208. In this situation, one or more appliances/services 206, 208 may interact directly, at least in part, with the one or more offload engines 210A involved in such processing, in a manner that may by-pass, at least in part, the one or more switches 140 (e.g., to transfer traffic 55 to the one or more offload engines 210A from the one or more appliances/servers 206, 208, or vice versa). These one or more offload engines 210A may correspond to and/or be associated with, at least in part, the one or more appliances/services 206, 208 that are to be provided to and/or with respect to traffic 55 (e.g., in accordance with the one or more policies 25A).

Additionally or alternatively, in this usage model, after circuitry 118 initially receives traffic 55, circuitry 118 and/or one or more switches 140 may either (1) forward all of traffic 55 to one or more controllers 120 and/or one or more applications 208, or (2) forward only a portion of traffic 55 (e.g., one or more first packets in the flow to which traffic 55 belongs) to one or more controllers 120 and/or one or more applications 208. One or more controllers 120 and/or one or more applications 208 may determine, at least in part, based at least in part upon either all of the traffic 55 or only this portion of the traffic 55 (and/or the above parameters/factors), the one or more policies 25A that may apply to, at least in part, traffic 55, the one or more forwarding operations to be carried out by circuitry 118 in connection with traffic 55, the particular ones of the processing mechanisms 130 to which the traffic 55 is to be forwarded in the one or more forwarding operations, and/or the particular sequence order of the forwarding operations and/or processing to be imparted to the traffic 55. In this usage model, after the one or more controllers 120 and/or one or more applications 208 have made this determination, one or more controllers 120 may generate and/or provide, at least in part, to one or more switches 140 and/or circuitry 118 programming 184 that may configure and/or program, at least in part, one or more switches 140 with all of the forwarding operations to be carried out by circuitry 118 and/or one or more switches 140 in connection with traffic 55, the particular ones of the processing mechanisms 130 to which the traffic 55 is to be forwarded in these forwarding operations, and/or the particular sequence order of these forwarding operations and/or processing to be imparted to the traffic 55. Thereafter, circuitry 118 and/or one or more switches 140 may carry out these forwarding operations, etc. in accordance with this programming 184, for traffic 55 and/or any other ensuing traffic (e.g., traffic 290 received, at least in part, by circuitry 118 and/or one or more switches 140) that may correspond and/or be similar to, at least in part, traffic 55 in one or more salient and/or relevant aspects (e.g., in terms of corresponding, at least in part, to one or more of the above parameters/factors).

Additionally or alternatively, one or more controllers 120 (and/or one or more other privileged entities/applications) may reprogram, at least in part, the one or more switches 140 and/or may otherwise permit the one or more switches 140 to (1) determine, at least in part, whether traffic 55 may correspond to, adhere to, conform to, and/or match, at least in part, one or more policies 25A and/or (2) appropriately forward the traffic 55, based at least in part upon such one or more policies 25A, for appropriate processing. In this case, one or more switches 140 may use, at least in part, programming 184 to facilitate matching, at least in part, of the traffic 55 to one or more appropriate policies 25A.

Additionally or alternatively, the one or more policies 25A may be modified, at least in part, by and/or as a result, at least in part, of traffic 55 and/or 290 undergoing processing by and/or interaction with one or more processing mechanisms 130 and/or one or more controllers 120. For example, one or more controllers 120 and/or one or more (e.g., one or more appliances/network services 206) of the processing mechanisms 130 may modify, at least in part, the one or more policies 25A and/or may program, at least in part, one or more controllers 120 to appropriately process traffic 55 and/or 290 based at least in part upon the contents 230 of traffic 55 and/or the results of processing traffic 55 and/or 290 by one or more controllers 120 and/or one or more of the processing mechanisms 130. This may result, at least in part, in one or more controllers 120 issuing programming 184 to one or more switches 140 and/or circuitry 118 that may result, at least in part, in corresponding modification of the forwarding operations to be carried out by circuitry 118 and/or one or more switches 140 in connection with traffic 55 and/or 290, the particular ones of the processing mechanisms 130 to which the traffic 55 is to be forwarded in these forwarding operations, and/or the particular sequence order of these forwarding operations and/or processing to be imparted to the traffic 55 and/or 290.

Thus, in this embodiment, the programming 184, when executed, at least in part, by the circuitry 118 and/or one or more switches 140, may result, at least in part, in the received traffic 55 and/or 290 being processed by respective ones of the processing mechanisms 130 in accordance with the particular sequence order. Alternatively or additionally, in this embodiment, this particular sequence order may be such that the received traffic 55 and/or 290 is processed by respective ones 210A, 210N of the offload engines in a certain sequence order (e.g., one or more engines 210A may process the traffic before one or more engines 210N may process the traffic) that may be in-line with, at least in part, processing of the received traffic by one or more of the appliances/services 206, 207. In this embodiment, this certain sequence order may be determined (e.g., at least in part by one or more controllers 120 and/or one or more applications 208) based at least in part upon one or more policies 25A and/or one or more results of the respective processing of the traffic 55 and/or 290 by the appliances/services 206, 207 and/or offload engines 210A, 210N. These particular and/or certain sequence orders may be established, at least in part, so as to try to avoid and/or prevent resource contention. Additionally or alternatively, these particular and/or certain sequence orders may be established, at least in part, based at least in part upon interaction, at least in part, among or between appliances/services 206 and/or 207, one or more controllers 120, circuitry 118, and/or one or more engines 134.

For example, one or more controllers 120 and/or one or more applications 208 may establish for respective traffic flows 222A . . . 222N processing sequence orders 250A . . . 250N. These processing sequence orders 250A . . . 250N may be and/or comprise, at least in part, for respective traffic flows 222A . . . 222N received, at least in part, by circuitry 118 and/or one or more switches 140, the respective sequence orders of processing to be imparted by the processing mechanisms 130 to the respective received traffic flows 222A . . . 222N. For example, one or more sequence orders 250A may establish, at least in part, that one or more packets in traffic flow 222A are to be first processed by one or more appliances/services 206, and next, to be processed by one or more appliances/services 207, and next, to be processed by one or more engines 210A. However, one or more sequence orders 250N may establish, at least in part, that one or more packets in traffic flow 222N are to be first processed by one or more appliances 207, and next, to be processed by one or more engines 210A, and next, to be processed by one or more appliances 206, and next, to be processed by one or more engines 210N. These sequence orders 250A, 250N, as well as, the particular ones of the offload engines 134 and/or appliances/services comprised in the orders 250A, 250N, may be established, at least in part, in such a manner as to prevent resource contention with respect to each other and/or any other sequence orders comprised in sequence orders 250A . . . 250N. For example, as can be seen from the above sequence orders 250A, 250N, the flows 222A, 222N are never being contemporarily processed by the same processing mechanism. Additionally, the particular offload engines and/or appliances/services in the sequence orders 250A, 250N are selected so as to avoid contemporaneous use of the same ports, network communication links, bus communication resources, switch resources, etc. Additionally or alternatively, these sequence orders 250A . . . 250N may be determined based at least in part upon the results other processing (e.g., of the same and/or other flows by the processing mechanisms 130) and/or of one or more subsets of the policies 25A . . . 25N that may be associated therewith. For example, depending upon the results of such processing and/or of such policy subsets, additional and/or other processing may be determined to be imparted to these flows. The sequence orders 250A . . . 250N may be modified, at least in part, to take this into account, to avoid resource contention, and/or to otherwise improve processing efficiency. Further additionally or alternatively, one or more of the policies 25A . . . 25N may establish, at least in part, that such processing and/or the sequence orders 250A . . . 250N may take into account and/or be based at least in part upon current operational statuses (e.g., workload, workload balancing, quality of service, proper functioning status, operational capacity, etc.) of the circuitry 118, one or more switches 140, processing mechanisms 130, etc. Circuitry 118, one or more switches 140, processing mechanisms 130, offload engines 134, appliances/services 206, 207, etc., may provide, at least in part, current status information indicating, at least in part, such current operation statuses to one or more controllers 120 and/or one or more applications 208, in order to facilitate this.

In this embodiment, packets may be said to belong to a flow or traffic flow if the packets exhibit, at least in part, one or more commonalities, such as, for example, one or more common sources, destinations, ports, virtual local area network identifiers, and/or other commonalities. Also in this embodiment, information related to the one or more sources and/or destinations of the traffic 55 and/or 290 may be identified, at least in part, based, at least in part, upon one or more logical, physical, virtual, and/or protocol addresses (e.g., medium access control, network, internetwork, port, application, virtual machine, tenant, project, flow, etc. addresses, numbers, and/or identifiers) that may be comprised, at least in part, in header information comprised, at least in part, in contents 230 and/or portion 232. Of course, many modifications, variations, and/or alternatives are possible, and such (and/or other) information may be accounted for, tracked, and/or located elsewhere, without departing from this embodiment.

For example, as part of the one or more forwarding operations following an initial receipt of traffic 55 and/or 290 by circuitry 118 and/or one or more switches 140, circuitry 118 and/or processing mechanisms 130 may provide, at least in part, in association, at least in part, with traffic 55 and/or 290, one or more indications 170A . . . 170N. One or more indications 170A . . . 170N may indicate, at least in part, one or more processing operations associated with the processing mechanisms 130 that are to be used, at least in part, in one or more subsequent forwarding operations (e.g., carried out by the circuitry 118 and/or one or more switches 140).

For example, one or more indications 170A . . . 170N may indicate, at least in part, (1) one or more processing operations that are to be performed upon the traffic 55 and/or 290, (2) one or more processing operations that have been performed upon the traffic 55 and/or 290, (3) the sequence order (e.g., 250A) in which these processing operations are to be performed, (4) the particular processing mechanisms that are to perform these processing operations, (5) the ingress/egress ports, network nodes, entities, communication links, etc. that the traffic 55 and/or 290 is to transit in order to facilitate and implement, at least in part, the associated forwarding and/or processing operations. In this embodiment, one or more indications 170A . . . 170N may be implicit (e.g., not expressly recited in association with traffic 55 and/or 290), at least in part, and/or explicit (e.g., expressly recited in association with traffic 55 and/or 290), at least in part.

By way of example, in carrying out the particular sequence order 250A, different ingress and/or egress ports of the one or more switches 140 and/or processing mechanisms 130 may be used for respective forwarding operations and/or respective transmissions to the one or more switches 140. One or more indications 170A . . . 170N may indicate and/or track, at least in part, the ingress and/or egress ports (e.g., for respective packets in traffic 55 and/or 290) that are to be employed in carrying out sequence order 250A, in one or more forwarding/tracking tables 295 that may be comprised, at least in part, in one or more virtual switches 202 and/or one or more physical switches 204. As respective forwarding and/or processing operations are completed with respective to respective packets in traffic 55 and/or 290, this may be indicated in the one or more tables 295. Additionally or alternatively, one or more indications 170A . . . 170N may be explicitly appended, at least in part, and/or prepended, at least in part, to respective packets in the traffic 55 and/or 290 to permit the one or more switches 140 and/or circuitry 118 to (1) identify these respective packets from other packets and/or other portions of traffic 55 and/or 290 that may have the same or similar header (and/or other) information, (2) determine one or more next/subsequent hops, destinations, processing operations, and/or processing mechanisms to which these respective packets are to be sent, (3) determine one or more previous processing operations in the sequence 250A that these respective packets have already undergone, and/or (4) one or more respective ports via which these respective packets are to be transmitted to reach these one or more next hops, destinations, and/or processing mechanisms. Analogous (and/or other) techniques may be employed, in accordance with the foregoing, to indicate and/or track, for example, network nodes, entities, communication links, etc. that the traffic 55 and/or 290 is to transit in order to facilitate and implement, at least in part, the forwarding and/or processing operations associated with sequence order 250A. Advantageously, as a result, at least in part, of employing such techniques in this embodiment, one or more switches 140 and/or circuitry 118 may receive, at least in part, at multiple respective times, via the same (and/or different) respective ports, respective packets in traffic 55 and/or 290 that may have the same or similar header (and/or other) information, but may forward the respective packets to different destinations (e.g., different ones of the processing mechanisms 130, different processing operations, etc.), depending at least in part upon the one or more indications 170A . . . 170N, in such a way as to result in performance of the complete processing that is to be imparted in accordance with sequence order 250A.

Thus, in this embodiment, multiple forwarding operations may be employed that may result in the received traffic 55 and/or 290 being forwarded via multiple ports (e.g., 160A, 160B, 160N) of the one or more switches 140 and/or circuitry 118 to multiple (e.g., appliance/service 206, appliance/service 207, and/or offload engine 210A) of the processing mechanisms 130. In this embodiment, as stated previously, appliance/service 206 and appliance/service 207 may be at multiple, different respective network processing layers (e.g., X and Y, respectively).

Alternatively or additionally, other usage models are also contemplated in this embodiment. For example, one or more controllers 120 may program one or more switches 140 to forward to send one or more predetermined types and/or flows of traffic to one or more appliances/services 206. However, it may be appropriate (e.g., in order to carry out security related preprocessing) for one or more appliances/services 206 to utilize hardware resources (e.g., one or more offload engines 210A) in-line with the forwarding of the traffic to one or more appliances/services 206. In this situation, the programming of one or more switches 140 may result, at least in part, in one or more switches 140 forwarding the traffic to one or more offload engines 210A for processing. After processing the traffic, one or more engines 210A may forward the traffic back to one or more switches 140. One or more switches 140 then may forward the traffic to one or more appliances/services 206. Advantageously, such in-line hardware processing may reduce software overhead and/or latencies, and/or make such latencies more predictable.

In this embodiment, such in-line processing may result, at least in part, in forwarding, at least in part, traffic 55 directly (or essentially directly) to one or more of the offload engines 210A . . . 210N for processing. For example, in this embodiment, after being initially received, traffic 55 may be forwarded by one or more switches 140 (e.g., in accordance with one or more policies 25) directly (or essentially directly) to one or more of the offload engines 210A . . . 210N for processing, and thereafter, may be forwarded for further processing to one or more applications/virtual machines 208 only if such further processing is provided for (e.g., required) by one or more policies 25. However, in this case, prior thereto, one or more applications/virtual machines 208 may have appropriately modified, at least in part, one or more policies 25 to ensure that such further processing only occurs if it is truly appropriate. Such modification may have occurred, for example, as a result, at least in part, of interaction of the one or more applications/virtual machines 208 with one or more controllers 120 and/or (in one or more appropriate special cases) with the one or more switches 140 (e.g., directly). Advantageously, this may avoid, at least in part, unnecessary and/or undesirable processing overhead and/or thrash that may result from, for example, forwarding such traffic 55 for processing by hardware, and thereafter forwarding such traffic 55 for processing to one or more virtual machines, and subsequently forwarding such traffic 55 back to hardware for further processing.

Of course, many modifications are possible without departing from this embodiment. For example, in-line hardware processing may involve processing by multiple offload engines. For example, the programming of one or more switches 140 may result, at least in part, in one or more switches 140 forwarding the traffic to one or more offload engines 210A for security and/or other related processing. After processing the traffic, one or more engines 210A may forward the traffic back to one or more switches 140. One or more switches 140 then may forward the traffic to one or more engines 210N (e.g., for regular expression and/or other processing). After processing the traffic, one or more engines 210N may forward the traffic back to one or more switches 140. One or more switches 140 then may forward the traffic to one or more appliances/services 206.

Figure 3:
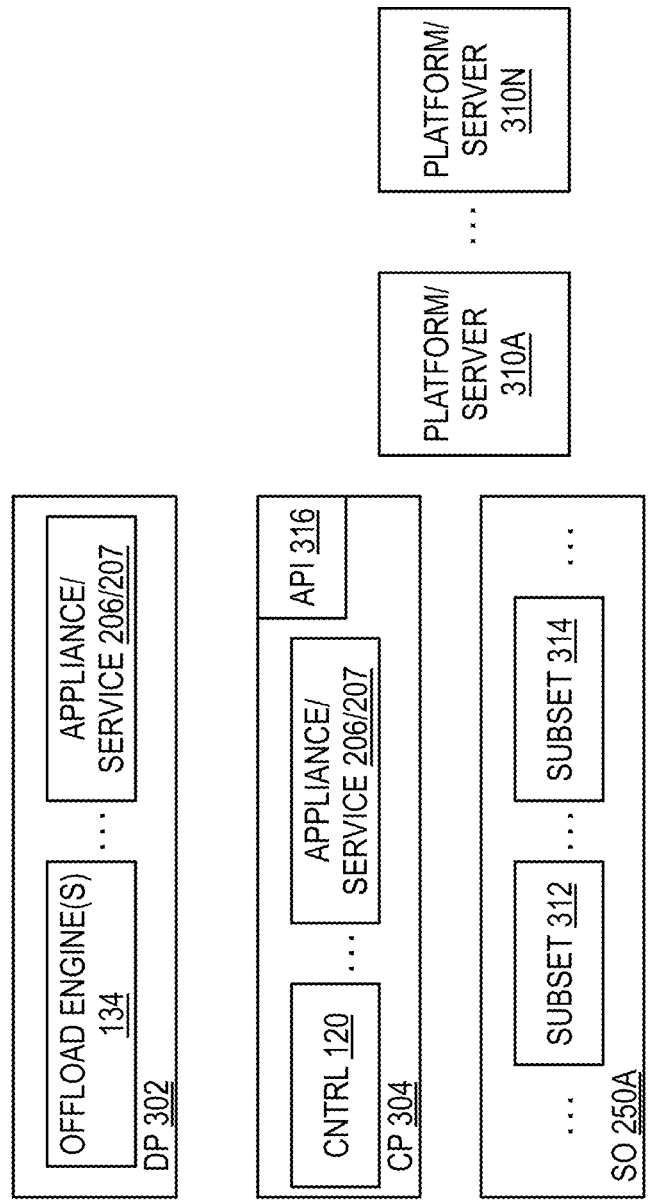
FIG. 3 illustrates features in an embodiment.

Additionally or alternatively, in order to improve processing and/or transmission efficiency and/or latency, and/or control jitter in SDN 101, sequence order 250A may be established, at least in part, in such as a way as to position adjacent to each other in the sequence order (e.g., to the extent reasonably practicable) 250A respective processing mechanisms/processing operations that are co-located or nearby (e.g., from a meaningful latency and/or efficiency standpoint) to each other (e.g., in the same server/platform or in nearby servers/platforms in the SDN 101), at least in part. For example, with reference being made to FIG. 3, SDN 101 may comprise, for example, data plane 302 and control plane 304 that may be implemented and/or embodied in and/or by, at least in part, a plurality of platforms and/or servers 310A . . . 310N. In this embodiment, the offload engines 134 may be comprised in, at least in part, data plane 302. Appliances/services 206, 207 may be comprised, at least in part, in control plane 304. Control plane 304 may also comprise, at least in part, one or more controllers 120 and/or API 316. In this example, in sequence order 250A, one or more subsets 312 of the engines 134 (e.g., comprising one or more engines 210A) may be adjacent to (e.g., in this case, immediately preceding) one or more subsets 314 of the appliances/services 206, 207 (e.g., comprising one or more appliances/services 206). One or more subsets 312 of the engines 134 may be co-located, at least in part, for example, at one or more common platforms/servers 310A.

Additionally or alternatively, in this embodiment, the topologies of the one or more applications/virtual machines, offload engines, etc. may be advantageously taken into account. For example, for certain processing flows and/or sequences, the processing sequence order and/or the locations of the entities that are to be perform the processing (e.g., the nodes, servers, etc. that comprise and/or embody these entities) may depend, at least in part, upon relative locations of these entities (e.g., of the virtual machines that may comprise the applications, etc.), the utilization levels of such entities, etc.

Additionally or alternatively, offload engines 134 may expose, at least in part, their respective capabilities to one or more of the appliances/services 206, 207 (e.g., one or more appliances/services 206) and/or one or more controllers 120. These one or more appliances/services 206 may use, at least in part, one or more API 316 to select, at least in part, which among the offload engines 134 and/or the appliances/services 206, 207 may be used, in accordance with, at least in part, one or more policies 25A, to process, at least in part, the traffic 55 and/or 290. For example, one or more appliances/services 206 may select subset 312 of the engines 134 and/or subset 314 of the appliances/services 206, 207 to process traffic 55 and/or 290, and may program, at least in part, one or more controllers 120 and/or control plane 304, using API 316, to program one or more switches 140 to forward the traffic 55 and/or 290 to these subsets 312, 314 in accordance with the sequence order 250A. The selection of subsets 312, 314 by one or more appliances/services 206 may be based, at least in part, upon one or more policies 25A, and/or the respective capabilities of the subsets 312, 314 and/or of the one or more platforms/servers that may comprise the respective subsets 312, 314 (e.g., including whether offload capabilities may be available on these one or more platforms/servers).

The programming that may be provided, at least in part, via API 316, may comprise, at least in part, exchange of information that may result in, at least in part, for example, selection of filters that may be used to determine, at least in part, which types/flows of traffic may be forwarded to which types of services, appliances, and/or offload engines. Such information may comprise, for example, whether and/or types of offload engine hardware and/or capabilities may be available (e.g., based at least in part upon previous registration of such offload engines with one or more switches 140, one or more controllers 120, and/or circuitry 118).

In this embodiment, various types of offload capabilities may be exposed that may facilitate certain type of processing options. For example, these options may facilitate, at least in part, stateless packet processing (e.g., identifying and/or classifying respective first (and/or other packets in respective flows), packet transformation (e.g., packet header/field insertion/removal, encryption/decryption), return of transformed packets and/or other (e.g., out-of-band data/status information) to appliances/services 206, 207, one or more controllers 120, etc.

In this embodiment, one or more controllers 120 may be capable of preventing conflict among policies 25A . . . 25N. One or more controllers 120 may accomplish this by ensuring that no policy is created or modified in such a way as to conflict with another policy in the policies 25A . . . 25N (e.g., that may, without departing from this embodiment, reside, at least in part, in one or more switches 140). Additionally, as stated previously, circuitry 118, one or more switches 140 and/or one or more controllers 120 may exhibit (in whole or in part) the features, construction, and/or operations of the policy engine circuitry described in co-pending U.S. patent application Ser. No. 13/675,324, filed Nov. 13, 2012, entitled "Policy Enforcement In Computing Environment." For example, in accordance with the aforesaid co-pending U.S. patent application, one or more switches 140 and/or circuitry 118 may comprise multiple (not shown) physical switches, virtual switches (e.g., vSwitches), API, and/or protected memory spaces distributed, replicated, and/or comprised, at least in part, in multiple of the platforms 310A . . . 310N. More specifically, these not shown physical switches, API, and/or protected memory spaces may be distributed, replicated, and/or comprised, at least in part, in respective not shown chipsets, host processors, and/or network interface controllers in the respective platforms/servers 310A . . . 310N. These features may permit, at least in part, one or more controllers 120 to be able to globally monitor, control and/or manage, at least in part, the respective configurations and/or operations of, and/or data stored in these distributed components, in accordance with the policies 25A . . . 25N, in order to permit the circuitry 118 to operate in the manner described previously.

Advantageously, this embodiment may be capable both of (1) individualizing the processing that may be imparted to received traffic on a per-user, per-policy basis, etc., and (2) coordinating the specific manner in which the policies, processing, and resource configuration/localization are implemented so as to meaningfully facilitate and/or improve processing efficiency. Advantageously, this may permit this embodiment to be capable of reducing or eliminating port, switch, and/or resource overuse, underuse, and/or thrashing in this embodiment. Also advantageously, this may prevent traffic from unwanted bouncing between or among the one or more switches and/or other resources, and/or may reduce the number of hops involved in traffic processing, in this embodiment.

Further advantageously, in this embodiment, the processing sequence orders, policies, and/or other processing-related decisions may be made and/or modified based at least in part upon real time or near real time status and/or capability information from the processing mechanisms, etc. Advantageously, this may permit this embodiment to be able to provide real time or near real time fine granularity for quality of service adjustments to be made to, and/or statistically accurate visibility of workloads and/or resource utilizations, as the workloads and/or utilizations change in this embodiment.

Further advantageously, in this embodiment, the processing sequence orders, policies, and/or other processing-related decisions may be made and/or modified based at least in part upon particular contents of the received traffic. Advantageously, this may permit this embodiment to offer improved processing/policy flexibility and dynamic processing capabilities.

Many other modifications are possible. For example, embodiments may comprise computer-readable memory that may be encoded with and/or store, at least in part, instructions and/or design data, usable by computer-aided design and/or fabrication machines, such as, Hardware Description Language (HDL), that may define and/or be used to construct structures, circuits, apparatuses, processors and/or system features described herein, such as, circuitry 118, and/or one or more components of circuitry 118, and/or other structures of SDN 101. Accordingly, this embodiment should be viewed broadly as encompassing all such alternatives, modifications, and variations.

What is claimed is:

1. An apparatus comprising:
forwarding mechanism hardware circuitry to perform at least one forwarding operation involving, at least in part, received traffic, the forwarding operation being determined based at least in part upon programming provided, at least in part, by at least one hardware controller, the programming being based at least in part upon at least one policy, the at least one forwarding operation being in accordance with the following subparagraphs (a) to (d):
   (a) after the circuitry has previously forwarded, at least in part, at least one previous time the received traffic, the at least one forwarding operation comprising again forwarding, at least in part, the received traffic to at least one processing mechanism of a plurality of processing mechanisms associated at least in part with a network to process the received traffic, the again forwarding being based at least in part upon at least one port via which the received traffic was previously at least partially received, at least one portion of contents of the received traffic, and the programming, the plurality of processing mechanisms comprising at least one hardware offload engine to perform in hardware certain processing operations in lieu of the certain processing operations being performed, at least in part, by a central processing unit CPU and/or software, the certain processing operations comprising one or more of the following: compression operations, decompression operations, secure socket layer operations, encryption operations, decryption operations, search operations, and/or comparison operations;
   (b) after receiving, at least in part, at multiple respective times the received traffic via a given port, the at least one forwarding operation comprising respectively forwarding, at least in part, by the forwarding mechanism hardware circuitry, the received traffic to different ones of the plurality of the processing mechanisms;
   (c) the at least one forwarding operation comprising multiple forwarding operations by the forwarding mechanism hardware circuitry to forward, at least in part, the received traffic to multiple of the plurality of the processing mechanisms in a sequence order that permits a combined processing to be carried out that satisfies the at least one policy; and
   (d) the at least one forwarding operation comprising providing, at least in part, by the forwarding mechanism hardware circuitry, in association, at least in part, with the received traffic at least one indication of at least one processing operation associated with the at least one processing mechanism, the at least one indication to be used, at least in part, in a subsequent forwarding operation of the forwarding mechanism circuitry;
wherein:
   a subset of the plurality of processing mechanisms is selected to process the received traffic based at least in part upon:
      the at least one policy;
      at least one capability of at least one platform; and
      whether offload is available at the at least one platform.

2. The apparatus of claim 1, wherein:
the plurality of processing mechanisms comprise:
   at least one network service;
the at least one hardware offload engine is comprised in the forwarding mechanism circuitry; and
the forwarding mechanism circuitry comprises at least one physical switch and at least one virtual switch.

3. The apparatus of claim 2, wherein:
the at least one controller is at least one software-defined network (SDN) controller;
the received traffic is received, at least in part, at the forwarding mechanism circuitry;
the at least one policy is based at least in part upon:
   at least one of:
      at least one SDN tenant associated with the received traffic;
      at least one cloud computing environment tenant associated with the traffic; and
      at least one shared infrastructure tenant associated with the traffic;
   at least one of:
      at least one source of the received traffic;
      at least one network type of the received traffic;
      at least one network identification of the received traffic; and
      at least one destination of the received traffic;
   at least one use of the received traffic;
   at least one flow to which the received traffic belongs, at least in part;
   at least one interaction involving, at least in part, the received traffic and the at least one network service; and
   the at least one portion of the contents of the received traffic; and
the forwarding mechanism circuitry is to request, in response at least in part to an initial reception of the received traffic, the programming from the at least one SDN controller.

4. The apparatus of claim 2, wherein:
the programming, when executed, at least in part, by the forwarding mechanism circuitry, results in the received traffic undergoing respective processing by the at least one network service and the at least one offload engine that corresponds, at least in part, to at least one service that is to be provided with respect to the received traffic in accordance with the at least one policy.

5. The apparatus of claim 4, wherein:
the at least one network service comprises, at least in part, at least one of:
   at least one virtual appliance; and
   at least one physical appliance;
the at least one offload engine comprises a plurality of offload engines;
the programming, when executed, at least in part, by the forwarding mechanism circuitry results, at least in part, in the received traffic being processed by respective ones of the plurality of offload engines, in a certain sequence order, in-line with, at least in part, the received traffic being processed by the at least one of the at least one virtual appliance and the at least one physical appliance; and
the certain sequence order is determined based at least in part upon at least one result of the respective processing and the at least one policy.

6. The apparatus of claim 5, wherein:
the at least one policy comprises a plurality of policies;
the at least one controller is to establish, at least in part, the certain sequence order and the respective ones of the plurality of offload engines in such a manner as to prevent resource contention with respect to other respective sequence orders of other respective processing of other respective received traffic by the plurality of offload engines and the virtual and physical appliances;
the other respective sequence orders are determined based at least in part upon results of other respective processing and a subset of the plurality of policies;
the plurality of policies are based, at least in part, upon current status information provided, at least in part, by the plurality of offload engines and the virtual and physical appliances.

7. The apparatus of claim 5, wherein:
the plurality of offload engines are in, at least in part, a data plane of a software-defined network (SDN);
the appliances are in, at least in part, the data plane and a control plane of the SDN;
in the certain sequence order, a subset of the plurality of offload engines is adjacent to a subset of the appliances; and
the subset of the plurality of offload engines and the subset of the appliances are co-located, at least in part, at a common server.

8. The apparatus of claim 5, wherein:
one or more of the plurality of offload engines and the appliances are to expose, at least in part, respective capabilities of the plurality of offload engines to at least one software-defined network (SDN) service; and
the at least one SDN service is to use at least one application program interface to select at least one parameter to be used by the at least one controller to determine, at least in part, which among the plurality of offload engines and the appliances are to be used, in accordance with the at least one policy, to process the received traffic.

9. The apparatus of claim 1, wherein:
the plurality of processing mechanisms comprise:
   at least one network service; and
the at least one network service is to program, at least in part, the at least one controller to program, at least in part, the forwarding mechanism circuitry as to how the forwarding mechanism circuitry is to perform, at least in part, the at least one forwarding operation.

10. The apparatus of claim 1, wherein:
the multiple forwarding operations result in the received traffic being forwarded via multiple ports of the forwarding mechanism circuitry to multiple processing mechanisms at least one of multiple network processing layers and multiple network processing functions.

11. The apparatus of claim 1, wherein:
the at least one controller is at least one software-defined network (SDN) controller;
the received traffic is received, at least in part, by the at least one SDN controller; and
in response, at least in part, to the received traffic, the at least one SDN controller is to provide, at least in part, the programming and the received traffic to the forwarding mechanism circuitry.

12. The apparatus of claim 1, wherein:
the plurality of processing mechanisms comprises at least one network service that comprises at least one of:
   at least one virtual appliance; and
   at least one physical appliance; and
the at least one of the at least one virtual appliance and the at least one physical appliance is to be involved in interaction, at least in part, with at least one of:
   the at least one controller;
   the forwarding mechanism circuitry; and
   the at least one offload engine.

13. The apparatus of claim 1, wherein:
the plurality of processing mechanisms comprises at least one of:
   at least one network service;
   at least one appliance; and
   at least one virtual appliance.

14. Non-transitory, physical computer-readable memory storing one or more instructions that when executed by a machine result in performance of operations comprising:
performing by forwarding mechanism hardware circuitry at least one forwarding operation involving, at least in part, received traffic, the forwarding operation being determined based at least in part upon programming provided, at least in part, by at least one hardware controller, the programming being based at least in part upon at least one policy, the at least one forwarding operation being in accordance with the following subparagraphs (a) to (d):
   (a) after the circuitry has previously forwarded, at least in part, at least one previous time the received traffic, the at least one forwarding operation comprising again forwarding, at least in part, the received traffic to at least one processing mechanism of a plurality of processing mechanisms associated at least in part with a network to process the received traffic, the again forwarding being based at least in part upon at least one port via which the received traffic was previously at least partially received, at least one portion of contents of the received traffic, and the programming, the plurality of processing mechanisms comprising at least one hardware offload engine to perform in hardware certain processing operations in lieu of the certain processing operations being performed, at least in part, by a central processing unit CPU and/or software, the certain processing operations comprising one or more of the following: compression operations, decompression operations, secure socket layer operations, encryption operations, decryption operations, search operations, and/or comparison operations;

(b) after receiving, at least in part, at multiple respective times the received traffic via a given port, the at least one forwarding operation comprising respectively forwarding, at least in part, by the forwarding mechanism hardware circuitry, the received traffic to different ones of the plurality of the processing mechanisms;

(c) the at least one forwarding operation comprising multiple forwarding operations by the forwarding mechanism hardware circuitry to forward, at least in part, the received traffic to multiple of the plurality of the processing mechanisms in a sequence order that permits a combined processing to be carried out that satisfies the at least one policy; and (d) the at least one forwarding operation comprising providing, at least in part, by the forwarding mechanism hardware circuitry, in association, at least in part, with the received traffic at least one indication of at least one processing operation associated with the at least one processing mechanism, the at least one indication to be used, at least in part, in a subsequent forwarding operation of the forwarding mechanism circuitry;

wherein:
a subset of the plurality of processing mechanisms is selected to process the received traffic based at least in part upon:
the at least one policy;
at least one capability of at least one platform; and
whether offload is available at the at least one platform.

15. The computer-readable memory of claim 14, wherein:
the plurality of processing mechanisms comprise:
at least one network service;
the at least one hardware offload engine is comprised in the forwarding mechanism circuitry; and
the forwarding mechanism circuitry comprises at least one physical switch and at least one virtual switch.

16. The computer-readable memory of claim 15, wherein:
the at least one controller is at least one software-defined network (SDN) controller;
the received traffic is received, at least in part, at the forwarding mechanism circuitry;
the at least one policy is based at least in part upon:
at least one of:
at least one SDN tenant associated with the received traffic;
at least one cloud computing environment tenant associated with the received traffic; and
at least one shared infrastructure tenant associated with the received traffic;
at least one of:
at least one source of the received traffic;
at least one network type of the received traffic;
at least one network identification of the received traffic; and
at least one destination of the received traffic;
at least one use of the received traffic;
at least one flow to which the received traffic belongs, at least in part;
at least one interaction involving, at least in part, the received traffic and the at least one network service; and
the at least one portion of the contents of the received traffic; and
the forwarding mechanism circuitry is to request, in response at least in part to an initial reception of the received traffic, the programming from the at least one SDN controller.

17. The computer-readable memory of claim 15, wherein:
the programming, when executed, at least in part, by the forwarding mechanism circuitry, results in the received traffic undergoing respective processing by the at least one network service and the at least one offload engine that corresponds, at least in part, to at least one service that is to be provided with respect to the received traffic in accordance with the at least one policy.

18. The computer-readable memory of claim 17, wherein:
the at least one network service comprises, at least in part, at least one of:
at least one virtual appliance; and
at least one physical appliance;
the at least one offload engine comprises a plurality of offload engines;
the programming, when executed, at least in part, by the forwarding mechanism circuitry results, at least in part, in the received traffic being processed by respective ones of the plurality of offload engines, in a certain sequence order, in-line with, at least in part, the received traffic being processed by the at least one of the at least one virtual appliance and the at least one physical appliance; and
the certain sequence order is determined based at least in part upon at least one result of the respective processing and the at least one policy.

19. The computer-readable memory of claim 18, wherein:
the at least one policy comprises a plurality of policies;
the at least one controller is to establish, at least in part, the certain sequence order and the respective ones of the plurality of offload engines in such a manner as to prevent resource contention with respect to other respective sequence orders of other respective processing of other respective received traffic by the plurality of offload engines and the virtual and physical appliances;
the other respective sequence orders are determined based at least in part upon results of other respective processing and a subset of the plurality of policies;
the plurality of policies are based, at least in part, upon current status information provided, at least in part, by the plurality of offload engines and the virtual and physical appliances.

20. The computer-readable memory of claim 19, wherein:
the plurality of offload engines are in, at least in part, a data plane of a software-defined network (SDN);
the appliances are in, at least in part, the data plane and a control plane of the SDN;
in the certain sequence order, a subset of the plurality of offload engines is adjacent to a subset of the appliances; and
the subset of the plurality of offload engines and the subset of the appliances are co-located, at least in part, at a common server.

21. The computer-readable memory of claim 19, wherein:
one or more of the plurality of offload engines and the appliances are to expose, at least in part, respective capabilities of the plurality of offload engines to at least one software-defined network (SDN) service; and
the at least one SDN service is to use at least one application program interface to select at least one parameter to be used by the at least one controller to determine, at least in part, which among the plurality of offload engines and the appliances are to be used, in accordance with the at least one policy, to process the received traffic.

22. The computer-readable memory of claim 14, wherein:
the plurality of processing mechanisms comprise:
at least one network service; and
the at least one network service is to program, at least in part, the at least one controller to program, at least in part, the forwarding mechanism circuitry as to how the forwarding mechanism circuitry is to perform, at least in part, the at least one forwarding operation.

23. The computer-readable memory of claim 14, wherein:
the multiple forwarding operations result in the received traffic being forwarded via multiple ports of the forwarding mechanism circuitry to multiple processing mechanisms at least one of multiple network processing layers and multiple network processing functions.

24. The computer-readable memory of claim 14, wherein:
the at least one controller is at least one software-defined network (SDN) controller;
the received traffic is received, at least in part, by the at least one SDN controller; and
in response, at least in part, to the received traffic, the at least one SDN controller is to provide, at least in part, the programming and the received traffic to the forwarding mechanism circuitry.

25. The computer-readable memory of claim 14, wherein:
the plurality of processing mechanisms comprises at least one network service that comprises at least one of:
at least one virtual appliance; and
at least one physical appliance; and
the at least one of the at least one virtual appliance and the at least one physical appliance is to be involved in interaction, at least in part, with at least one of:
the at least one controller;
the forwarding mechanism circuitry; and
the at least one offload engine.

26. The computer-readable memory of claim 14, wherein:
the plurality of processing mechanisms comprises at least one of:
at least one network service;
at least one appliance; and
at least one virtual appliance.

27. A method comprising:
performing by forwarding mechanism hardware circuitry at least one forwarding operation involving, at least in part, received traffic, the forwarding operation being determined based at least in part upon programming provided, at least in part, by at least one hardware controller, the programming being based at least in part upon at least one policy, the at least one forwarding operation being in accordance with the following subparagraphs (a) to (d):
(a) after the circuitry has previously forwarded, at least in part, at least one previous time the received traffic, the at least one forwarding operation comprising again forwarding, at least in part, the received traffic to at least one processing mechanism of a plurality of processing mechanisms associated at least in part with a network to process the received traffic, the again forwarding being based at least in part upon at least one port via which the received traffic was previously at least partially received, at least one portion of contents of the received traffic, and the programming, the plurality of processing mechanisms comprising at least one hardware offload engine to perform in hardware certain processing operations in lieu of the certain processing operations being performed, at least in part, by a central processing unit CPU and/or software, the certain processing operations comprising one or more of the following: compression operations, decompression operations, secure socket layer operations, encryption operations, decryption operations, search operations, and/or comparison operations;
(b) after receiving, at least in part, at multiple respective times the received traffic via a given port, the at least one forwarding operation comprising respectively forwarding, at least in part, by the forwarding mechanism hardware circuitry, the received traffic to different ones of the plurality of the processing mechanisms;
(c) the at least one forwarding operation comprising multiple forwarding operations by the forwarding mechanism hardware circuitry to forward, at least in part, the received traffic to multiple of the plurality of the processing mechanisms in a sequence order that permits a combined processing to be carried out that satisfies the at least one policy; and
(d) the at least one forwarding operation comprising providing, at least in part, by the forwarding mechanism hardware circuitry, in association, at least in part, with the received traffic at least one indication of at least one processing operation associated with the at least one processing mechanism, the at least one indication to be used, at least in part, in a subsequent forwarding operation of the forwarding mechanism circuitry;
wherein:
a subset of the plurality of processing mechanisms is selected to process the received traffic based at least in part upon:
the at least one policy;
at least one capability of at least one platform; and
whether offload is available at the at least one platform.

28. The method of claim 27, wherein:
the plurality of processing mechanisms comprise:
at least one network service;
at least one hardware offload engine is comprised in the forwarding mechanism circuitry; and
the forwarding mechanism circuitry comprises at least one physical switch and at least one virtual switch.

29. The apparatus of claim 1, wherein:
at least one of the multiple forwarding operations, the multiple of the plurality of the processing mechanisms, and the sequence order depend, at least in part, upon one or more of:
relative locations of the processing mechanisms; and
utilization levels of the processing mechanisms.

* * * * *